United States Patent
Cloyd

[11] 3,806,086
[45] Apr. 23, 1974

[54] AUTOMATIC SHUT-OFF VALVE FOR ADMINISTRATION OF STERILE FLUIDS

[75] Inventor: Harold S. Cloyd, Erie, Pa.

[73] Assignee: Nosco Plastics, Incorporated, Erie, Pa.

[22] Filed: Mar. 15, 1973

[21] Appl. No.: 341,357

[52] U.S. Cl. .......................................... 251/149.7
[51] Int. Cl. ............................................. F16l 37/28
[58] Field of Search.......... 251/149.1, 149 A, 149.6, 251/149.7; 137/614.04; 128/221, 274

[56] References Cited
UNITED STATES PATENTS

| | | | |
|---|---|---|---|
| 3,640,309 | 2/1972 | Demler, Sr. | 137/614.04 |
| 2,391,022 | 12/1945 | Main | 251/149.4 |
| 3,570,484 | 3/1971 | Steer et al. | 251/149.6 |
| 2,158,593 | 5/1939 | Scrimgeour | 128/221 |
| 3,542,024 | 11/1970 | Borke | 128/221 |

*Primary Examiner*—William R. Cline
*Attorney, Agent, or Firm*—Ralph Hammar

[57] ABSTRACT

An automatic shut-off valve for sterile fluids which is low enough in cost to be used once and thrown away.

The valve body comprises two coaxial plastic parts having telescoping sections united together. One part has a Luer type outlet fitting and a bore. The other part has a Luer type inlet fitting.

The valve member comprises a single piece of plastic with a head of smaller diameter than the bore which at all times remains in the bore, a flange diverging at an acute angle from the head and terminating in a rim of diameter larger than the bore, and a stem extending into the outlet fitting.

A spring biases the valve member to the closed position in which the rim of the flange makes sealing engagement with the body by its inherent resilience.

The seal depends upon the position of the valve member and does not depend upon the pressure of the spring.

The valve is opened when the complementary part of the outlet fitting engages the stem and moves the rim of the flange out of the bore.

1 Claim, 3 Drawing Figures

AUTOMATIC SHUT-OFF VALVE FOR ADMINISTRATION OF STERILE FLUIDS

This invention is an automatic shut-off valve comprising a body having a bore slidably receiving a valve member with a flexible annular flanged having its rim held in sealing contact with the bore by hydraulic pressure and by the resilience of the flange.

Figure 1:
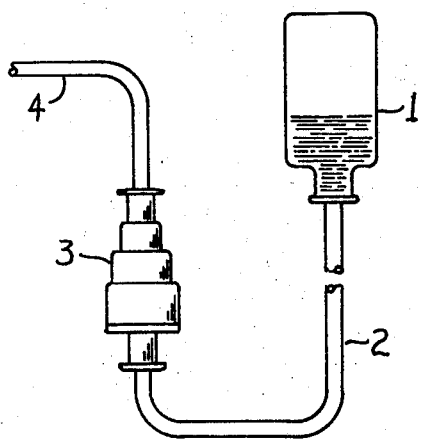
Figure 2:
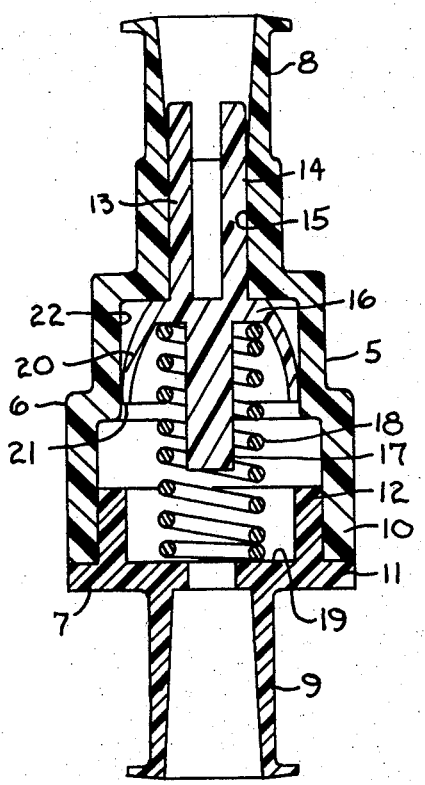
Figure 3:
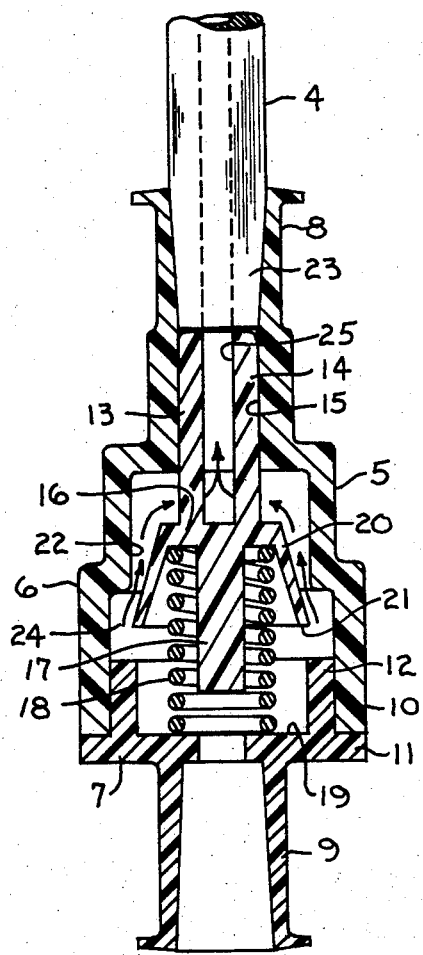

In the drawing, FIG. 1 is a diagrammatic view illustrating the use of the valve, FIG. 2 is a longitudinal section through the valve in the closed position, and FIG. 3 is a similar section in the open position.

In some medical procedures it is necessary to feed sterile fluids to the patient under the control of an automatic shut-off valve which closes whenever the line leading to the patient is disconnected from the valve. FIG. 1 diagrammatically shows such an installation where 1 indicates the container for the sterile fluid, 2 the supply line leading to the shut-off valve 3, and 4 the line leading to the patient. Flow to the patient is established by connecting the line 4 to the valve 3 and is stopped by removing or disconnecting the line 4 from the valve.

The valve 3 as shown in detail in FIGS. 2 and 3, has a body 5 comprising upper and lower parts 6, 7 respectively integral with Luer type fittings 8, 9 for connection to the lines 4, 2. Female type fittings are shown but obviously the inlet fitting 9 could be male type.

The upper part 6 is provided with a cylindrical flange 10 at its lower end which is seated on an outwardly projecting flange 11 on the lower part 7 and is telescoped over an upwardly extending cylindrical flange 12 on the part 7. The parts 6 and 7 are separately molded of suitable inert plastic such as polyethylene, polypropylene, etc. and are permanently connected by suitable solvent or other joints between the flanges 10, 11, 12.

Within the valve body 5 is a valve member 13 having a stem 14 slidably received in a bore 15 at the lower end of the fitting 8. At the lower end of the stem is a head 16 at the center of which is a depending guide 17 for a coil spring 18 having its upper end seated on the under side of the head 16 and its lower end seated on the bottom wall 19 of part 7.

Extending outward at an acute angle from the outer periphery of the heat 16 is an annular flange 20 having its lower end terminating in a rim 21 of greater outside diameter than a bore 22. The flange 20 is molded of one of the flexible plastics such as polyethylene and has a wall thickness (e.g. 0.015 inches) such that the flange is quite flexible so that when the spring 18 moves the valve member 13 to the closed position shown in FIG. 2, the lower edge or rim 21 of the flange is compressed and makes conforming contact with the bore 22, producing a liquid tight seal. The head 16 is of smaller diameter than the bore 22 and remains within the bore at all times. The sealing engagement of the flange with the bore is supplemented by hydraulic pressure. Hydraulic pressure also holds the valve member 13 in the uppermost or closed position shown in FIG. 2. The sealing engagement does not depend upon the pressure of spring 18. A seal is effected between the flange and the bore 22 as soon as the rim 21 of the flange enters the bore. In the particular valve illustrated, the sealing point may vary approximately 3/32 inch along the bore. The dimensions mentioned in this paragraph apply to the specific valve and are not by way of limitation. The sealing engagement between the flange and the bore is essentially independent of out of roundness of the bore or of shock and vibration. The sealing engagement also tolerates substantial variations in the diameter of the bore. The valve doesn't mind rough handling and would be extremely difficult to open accidentally.

To open the valve, a male type Luer fitting 23 on the tube 4 is inserted in the fitting 8. This pushes the stem 14 downward, moving the rim 21 of the flange 20 out of the bore 22 to the position shown in FIG. 3 and permitting flow of liquid in the direction indicated by arrows 24. The fluid flows around the outside of the flange 20 and the head 16 and out through a diametral slot 25 in the stem 14 which provides a fluid passageway between the stem and the outlet fitting. To stop the flow it is merely necessary to remove the fitting 23, allowing the valve to be returned to the closed position shown in FIG. 2 by hydraulic pressure supplemented by the spring 18.

The valve is inherently low enough in cost to permit one time use. The body 6 consists of two simple plastic parts. The head 16 and its flange 20 and stem 14 may also be easily molded as a single piece of plastic.

What is claimed is:

1. A valve body having inlet and outlet fittings for connection to fluid lines and a bore through which fluid flows with one end leading to the outlet fitting and the other end leading to the inlet fitting, said body comprising two coaxial plastic parts, one part comprising the outlet fitting and bore and the other part comprising the inlet fitting, said parts having telescoping sections united together, a valve head of smaller diameter than said bore having an annular flange receivable in said bore and diverging from one side of the head outward toward said inlet end of the bore at an acute angle and terminating in a rim of outside diameter greater than the inside diameter of the bore so that the rim of the flange is compressed when received in said bore, said head being of smaller diameter than the bore and remaining at all times within the bore, said flange being of flexible plastic and said rim making sealing engagement with the bore by the inherent resilience of the flange and cooperating with the head to close the bore, a stem extending from the opposite side of the head into the outlet fitting and having a fluid passageway between the stem and the outlet fitting, said head and its flange and stem constituting a single piece of molded plastic, the outlet fitting being one part of a Luer fitting and the complementary part of said Luer fitting engaging said stem and moving the head from a closed position with the rim of the flange received in said bore to an open position with the rim of the flange outside said inlet end of the bore and with the head and the adjoining portion of the flange within and spaced from the bore to provide a fluid passageway to the outlet end of the bore, the stem being guided in said outlet fitting and the head being biased toward said outlet fitting by a coil spring seated on the head.

* * * * *